(12) United States Patent
Lin

(10) Patent No.: US 11,214,875 B2
(45) Date of Patent: Jan. 4, 2022

(54) GAS GENERATOR

(71) Applicant: Hsin-Yung Lin, Shanghai (CN)

(72) Inventor: Hsin-Yung Lin, Shanghai (CN)

(*) Notice: Subject to any disclaimer, the term of this patent is extended or adjusted under 35 U.S.C. 154(b) by 0 days.

(21) Appl. No.: 16/028,156

(22) Filed: Jul. 5, 2018

(65) Prior Publication Data

US 2019/0010618 A1 Jan. 10, 2019

(30) Foreign Application Priority Data

Jul. 6, 2017 (CN) .......................... 201710545350.X

(51) Int. Cl.
| | | |
|---|---|---|
| *C25B 1/04* | (2021.01) | |
| *C25B 11/04* | (2021.01) | |
| *C25B 15/08* | (2006.01) | |
| *C01B 3/06* | (2006.01) | |
| *C25B 9/17* | (2021.01) | |
| *G01F 23/26* | (2006.01) | |

(52) U.S. Cl.
CPC .................. *C25B 1/04* (2013.01); *C01B 3/06* (2013.01); *C25B 9/17* (2021.01); *C25B 11/04* (2013.01); *C25B 15/08* (2013.01); *G01F 23/265* (2013.01)

(58) Field of Classification Search
None
See application file for complete search history.

(56) References Cited

U.S. PATENT DOCUMENTS

| | | | |
|---|---|---|---|
| 5,690,797 A | 11/1997 | Harada et al. | |
| 2007/0210063 A1* | 9/2007 | Conrad | A47J 37/067 219/449.1 |
| 2014/0374243 A1* | 12/2014 | Lin | C25B 9/00 204/228.3 |
| 2016/0108528 A1* | 4/2016 | Lin | C25B 15/08 204/276 |

FOREIGN PATENT DOCUMENTS

| | | |
|---|---|---|
| CN | 102465310 A | 5/2012 |
| CN | 202576577 U | 12/2012 |

(Continued)

OTHER PUBLICATIONS

Capacitive Level Sensors (https://www.fluidswitch.com/2015/07/06/capacitive-level-sensors-how-they-work-and-their-benefits/). (Year: 2015).*

*Primary Examiner* — Nicholas A Smith

(57) ABSTRACT

The present invention provides a gas generator and comprises an electrolysis device, a water supplying device, and a liquid level detector. The electrolysis device is configured for electrolyzing water to generate hydrogen. The water supplying device is coupled to the electrolysis device for supplying the supplementary water into the electrolysis device. The liquid level detector is coupled to an outer surface of the electrolysis device for detecting a liquid level of the electrolyzed water, wherein the gas generator supplies supplementary water into the electrolysis device according to the liquid level detected by the liquid level detector. The present invention is provided for measuring the liquid level by using the non-contact liquid level detector, and supplying (Continued)

supplementary water into the electrolysis device according to the liquid level to ensure that the electrolysis device contains sufficient water for electrolyzing, thereby improving the life and safety of the gas generator.

19 Claims, 7 Drawing Sheets

(56) References Cited

FOREIGN PATENT DOCUMENTS

| | | | |
|---|---|---|---|
| CN | 203609733 U | | 5/2014 |
| JP | 2016215123 A | | 12/2016 |
| TW | 513027 U | * | 12/2015 |
| TW | M513027 U | | 12/2015 |
| TW | 201723233 A | | 7/2017 |

* cited by examiner

GAS GENERATOR

CROSS-REFERENCE TO RELATED APPLICATIONS

This application claims the priority benefit of Chinese Application Serial No. 201710545350.X filed Jul. 6, 2017 the disclosure of which is incorporated herein by reference.

BACKGROUND OF THE INVENTION

1. Field of the Invention

The present invention relates to a gas generator, and more particularly, to a gas generator with external liquid level detector.

2. Description of the Prior Art

As people have always been paying much attention on health developments, many developments in medical technology are often targeted on treating diseases and prolonging human life. Also, most of the treatments in the past are passive, which means that the disease is treated only when it occurs, and the treatments may include an operation, a medication treatment, a radiation therapy, or a medical treatment for cancer. However, in recent years, most of the medical experts' researches are gradually moving toward preventive medical methods, such as research on healthy food, screening and the prevention of inherited diseases, which actively prevents diseases from occurring in the future. Due to the focus of the prolongation of human life, many anti-aging and anti-oxidation technologies including skin care products and anti-oxidation food/medicine are gradually being developed and are becoming increasingly popular to the general public.

Studies have found that there are instable oxygen species (Of), also known as free radicals, in the human body. The free radicals are usually generated due to diseases, diet, and environment. And, one's lifestyle can be excreted in the form of water by reacting with the inhaled hydrogen. With this method, the amount of free radicals in the human body can be reduced, thereby restoring the body condition from an acidic state to an alkaline state, to achieve an anti-oxidation, anti-aging and beauty health effect, and even to eliminate chronic diseases. Furthermore, there are also clinical experiments showing that patients who need to inhale a high concentration of oxygen for an extended period of time would experience lung damage. However, it could be ameliorated by inhaling hydrogen.

General electrolysis device uses electrolytic liquid water to produce hydrogen for human inhalation, and there may be risks of dry-boiling if the liquid water is not enough for normal electrolysis, thus the detection of residual electrolytic water is in need. However, since the electrolyte within the electrolytic water may easily corrode the components, it will lead to failure of the liquid level detector and cause misjudgment of the electrolytic water amount. Therefore, it is necessary to design a gas generator for measuring the liquid level by using the non-contact liquid level detector, and supplying supplementary water into the electrolysis device according to the liquid level to ensure that the electrolysis device contains sufficient water for electrolyzing.

SUMMARY OF THE INVENTION

Therefore, the present inventor with many years engaged in the manufacture and development of related products and design experience went through the detailed design and careful assessment to finally confirm that the present invention is practically usable.

The present invention is to provide a gas generator for electrolyzing water to generate hydrogen, meanwhile measuring the liquid level by using the non-contact liquid level detector. And the supplementary water is supplied into the electrolysis device according to the liquid level to ensure that the electrolysis device contains sufficient water for electrolyzing; therefore, the life and safety of the gas generator can be improved.

The object of the present invention is to provide a gas generator comprising an electrolysis device, a water supplying device, and a liquid level detector. The electrolysis device contains electrolyzed water and electrolyzes water to generate hydrogen. The water supplying device contains supplementary water and supplies the supplementary water into the electrolysis device. The liquid level detector is coupled to an outer surface of the electrolysis device and not in contact with the electrolyzed water, wherein the liquid level detector generates a detecting signal by detecting a liquid level of the electrolyzed water.

According to one embodiment of the present invention, the gas generator further comprises an atomization reaction chamber coupled to the electrolysis device, wherein the atomization reaction chamber generates an atomized gas to mix the atomized gas with the hydrogen, and the water supplying device has a space for accommodating part of the atomization reaction chamber.

According to one embodiment of the present invention, the gas generator further comprises an atomization generating element coupled to the atomization reaction chamber, wherein the atomization generating element converts a precursor liquid contained in the atomization reaction chamber into the atomized gas.

According to one embodiment of the present invention, the water supplying device is coupled to the electrolysis device and the atomization reaction chamber, and the atomization reaction chamber receives the hydrogen generated by the electrolysis device through the water supplying device.

According to one embodiment of the present invention, the water supplying device is coupled to the electrolysis device for receiving the hydrogen generated by the electrolysis device. Furthermore, the hydrogen generated by the electrolysis device is passed into the supplementary water of the water supplying device.

According to one embodiment of the present invention, the gas generator supplies the supplementary water into the electrolysis device according to the detecting signal generated by the liquid level detector.

According to one embodiment of the present invention, the supplementary water is supplied into the electrolysis device when the liquid level detected by the liquid level detector is lower than a preset electrolysis low limit, and the supplying of the supplementary water is stopped when the liquid level is higher than a preset electrolysis high limit, wherein the electrolysis low limit is lower than the electrolysis high limit.

According to one embodiment of the present invention, the gas generator further comprises a water supplying pump coupled to the electrolysis device and the water supplying device for driving the supplementary water to flow into the electrolysis device.

According to one embodiment of the present invention, the liquid level detector is a capacitive water level gauge.

Another object of the present invention is to provide a gas generator comprising an electrolysis device, a water supplying device, and a liquid level detector. The electrolysis device contains electrolyzed water and electrolyzes water to generate hydrogen. The water supplying device contains supplementary water and supplies the supplementary water into the electrolysis device. The liquid level detector is coupled to an outer surface of the water supplying device and not in contact with the supplementary water, wherein the liquid level detector generates a detecting signal by detecting a liquid level of the supplementary water.

According to one embodiment of the present invention, the gas generator further comprises an atomization reaction chamber coupled to the electrolysis device, wherein the atomization reaction chamber further generates an atomized gas to mix the atomized gas with the hydrogen, and the water supplying device has a space for accommodating part of the atomization reaction chamber.

According to one embodiment of the present invention, the gas generator further comprises an atomization generating element coupled to the atomization reaction chamber, wherein the atomization generating element converts a precursor liquid contained in the atomization reaction chamber into the atomized gas.

According to one embodiment of the present invention, the water supplying device is coupled to the electrolysis device and the atomization reaction chamber, and the atomization reaction chamber receives the hydrogen generated by the electrolysis device through the water supplying device.

According to one embodiment of the present invention, the gas generator supplies the supplementary water into the electrolysis device according to the detecting signal generated by the liquid level detector.

According to one embodiment of the present invention, the water supplying device is coupled to the electrolysis device, and the hydrogen generated by the electrolysis device is passed into the supplementary water.

According to one embodiment of the present invention, the liquid level detector comprises an electrode plate, and the liquid level detector generates the detecting signal when the liquid level is lower than the height of the electrode plate. Therefore, the liquid level detector selectively generates the detecting signal.

According to one embodiment of the present invention, the liquid level detector comprises two electrode plates for generating different detecting signals according to whether the liquid level is lower than the height of the two electrode plates, between the height of the two electrode plates, or higher than the height of the two electrode plates.

According to one embodiment of the present invention, the electrolysis device is configured in the water supplying device.

According to one embodiment of the present invention, the liquid level detector is a capacitive water level gauge.

In conclusion, the present invention is to provide a gas generator for health application using an electrolyzing method to generate hydrogen. The gas generator comprises an electrolysis device, a water supplying device, and a liquid level detector. The electrolysis device generates hydrogen and the hydrogen is filtered by the water supplying device for inhalation by a user. The gas generator measures the liquid level by using the non-contact liquid level detector, and the supplementary water is supplied into the electrolysis device according to the liquid level to ensure that the electrolysis device contains sufficient water for electrolyzing. Therefore, the life and operating safety of the gas generator can be enhanced.

The advantages and spirits of the invention may be understood by the following recitations together with the appended drawings.

BRIEF DESCRIPTION OF THE APPENDED DRAWINGS

Some of the embodiments will be described in detail, with reference to the following figures, wherein like designations denote like members, wherein.

DETAILED DESCRIPTION OF THE INVENTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of embodiments of the present invention.

Figure 1:
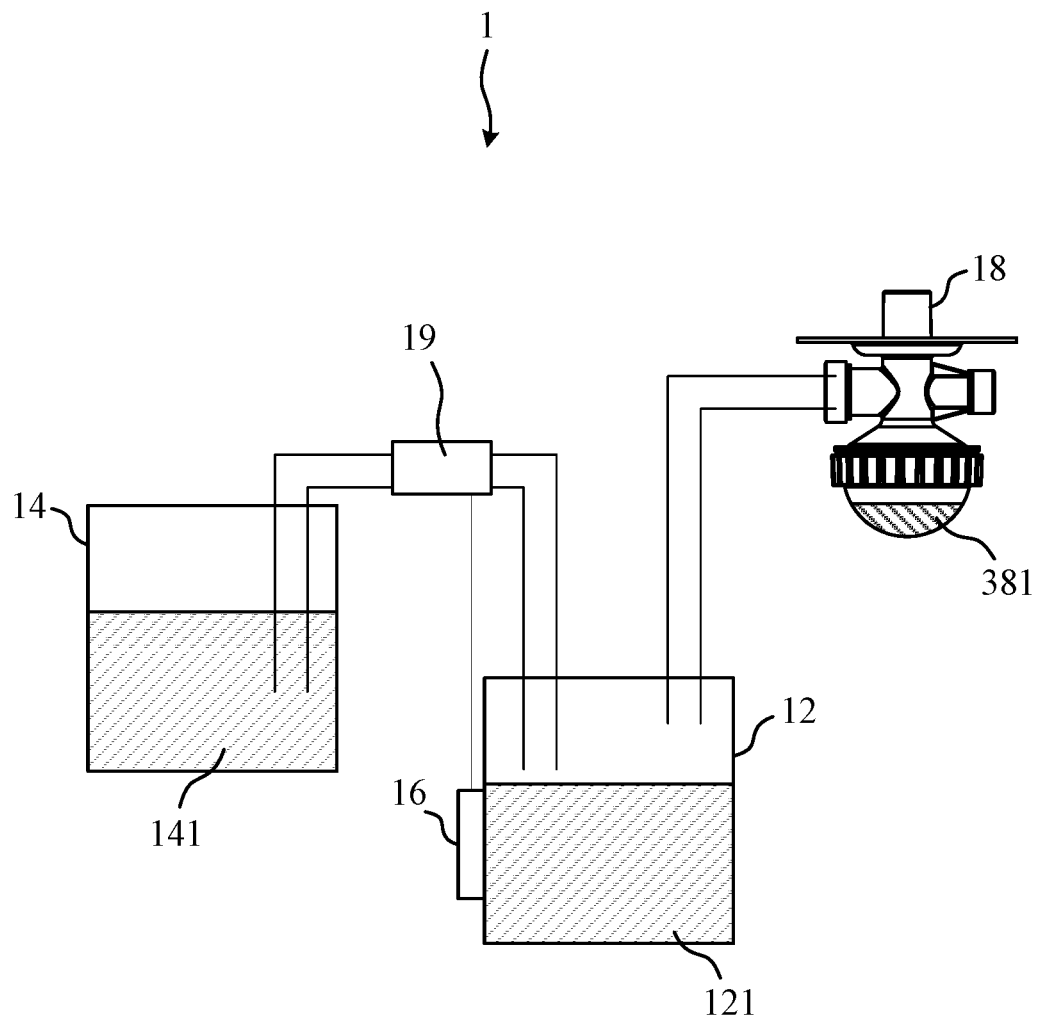
FIG. 1 shows a schematic diagram of the gas generator in one embodiment of the present invention.

Please refer to FIG. 1. FIG. 1 shows a schematic diagram of the gas generator in one embodiment of the present invention. According to one embodiment of the present invention, the gas generator 1 comprises an electrolysis device 12, a water supplying device 14, and a liquid level detector 16. The electrolysis device 12 contains electrolyzed water 121 and electrolyzes the electrolyzed water 121 to generate hydrogen. The water supplying device 14 contains supplementary water 141 and supplies the supplementary water 141 into the electrolysis device 12. The liquid level detector 16 is coupled to an outer surface of the electrolysis device 12 and not in contact with the electrolyzed water 121, wherein the liquid level detector 16 generates a detecting signal by detecting a liquid level of the electrolyzed water 121.

In one embodiment, the electrolysis device 12 is a two-electrode type electrolyzer, wherein the two electrodes can electrolyze water to respectively produce hydrogen and oxygen when the electrolyzer is energized. If the generated gas is accommodated in the same space, the hydrogen and oxygen mixed gas can be mixed and the ratio of the mixed hydrogen-oxygen gas is about 2:1. In another embodiment, the electrolysis device 12 is an ion membrane electrolysis device. Through the separation of the ion exchange membrane, the anode electrode in the anode chamber generates oxygen and the cathode electrode in the cathode chamber generates hydrogen. In addition, the required flow rate of oxygen and hydrogen is controlled by the gas flow meter, respectively connected to the anode chamber and the cathode chamber. As a result, the output ratio of the mixed hydrogen-oxygen gas can be controlled. In one embodiment, the output gases can be pure hydrogen, pure oxygen, or a hydrogen-oxygen mixed gas that can be optionally blended for human inhalation. Furthermore, an external gas can be passed into the pure hydrogen, pure oxygen, or a hydrogen-oxygen mixed gas to obtain a desired concentration ratio for subsequent application. Among them, the external gas can be air, water vapor, volatile gas or blunt gas.

Since the electrolysis device 12 uses electrolytic liquid water to produce hydrogen for human inhalation, the liquid water in the electrolysis device 12 is continuously consumed. And, there may be risks of dry-boiling if the electrolyzed water 121 is not enough for normal electrolysis, thus the detection of residual electrolyzed water 121 is in need in order to ensure the life and operating safety of the gas generator 1. The water supplying device 14 is coupled to the electrolysis device 12 for supplying the supplementary water 141 contained therein into the electrolysis device 12 for use as the electrolyzed water 121. In one embodiment, the gas generator 1 supplies the supplementary water 141 into the electrolysis device according to the detecting signal generated by the liquid level detector 16. In practice, the amount of the supplementary water 141 supplied into the electrolysis device 12 for use as the electrolyzed water 121 can be estimated by measuring the liquid level of the electrolyzed water 121. As a result, the amount of the electrolyzed water 121 within the electrolysis device 12 can be ensured for sufficient normal electrolysis to produce hydrogen.

Since the electrolyzed water 121 in the electrolysis device 12 may be rich in electrolyte, and the electrolyte is one of the culprits that causes damage to the electronic parts. If the liquid level gauge—such as a float water level gauge—for measuring the liquid level is in direct contact to the electrolyzed water 121, the liquid level gauge is liable to be damaged by the electrolytes in the electrolytic water 121 or its volatile gas, which results in a high possibility on measurement error of the liquid level gauge. In addition, since the liquid level gauge is either immersed in the liquid or exposed to the air, the frequent changes in the environment may also cause the measurement error of the liquid level gauge.

As a result, in one embodiment of the present invention, the liquid level detector 16 is coupled to an outer surface of the electrolysis device 12 and not in contact with the electrolyzed water 121. Therefore, the measured level of the liquid is in actual height and the liquid amount can be accurately calculated. The measurement form of the liquid level detector 16 can be an optical refraction method, a laser ranging method, an ultrasonic measurement method, a piezoelectric measurement method, a parasitic capacitance measurement method, or any method that does not require direct contact to the liquid. In practice, the liquid level detector 16 can be disposed on the outer surface of the electrolysis device 12 by a directly adhesive method in order to reduce the installation requirements of the liquid level detector 16.

In one embodiment, the gas generator 1 may determine whether the supplementary water 141 in the water supplying device 14 is to be supplied into the electrolysis device 12 according to the liquid level measured by the liquid level detector 16. The method can be operated through connecting the liquid level detector 16 with a water valve. The water valve is normally closed to prevent the supplementary water 141 in the water supplying device 14 from flowing into the electrolysis device 12, and the water valve is opened when the liquid level detected by the liquid level detector 16 is insufficient. The supplementary water 141 may be supplied into the electrolysis device 12 through gravity, siphoning or applying external force. The supplementary water 141 may be pure water or liquid water containing an electrolyte. In another embodiment, the liquid level detector 16 may be provided with a supplementary water pump 19, and the supplementary water pump 19 is coupled to the electrolysis device 12, the water supplying device 14, and the liquid level detector 16. The liquid level detector 16 decides whether to inform the supplementary water pump 19 for driving the supplementary water 141 of the water supplying device 14 to flow into the electrolysis device 12. The supplementary water pump 19 can be a vacuum pump or water pump.

Figure 2:
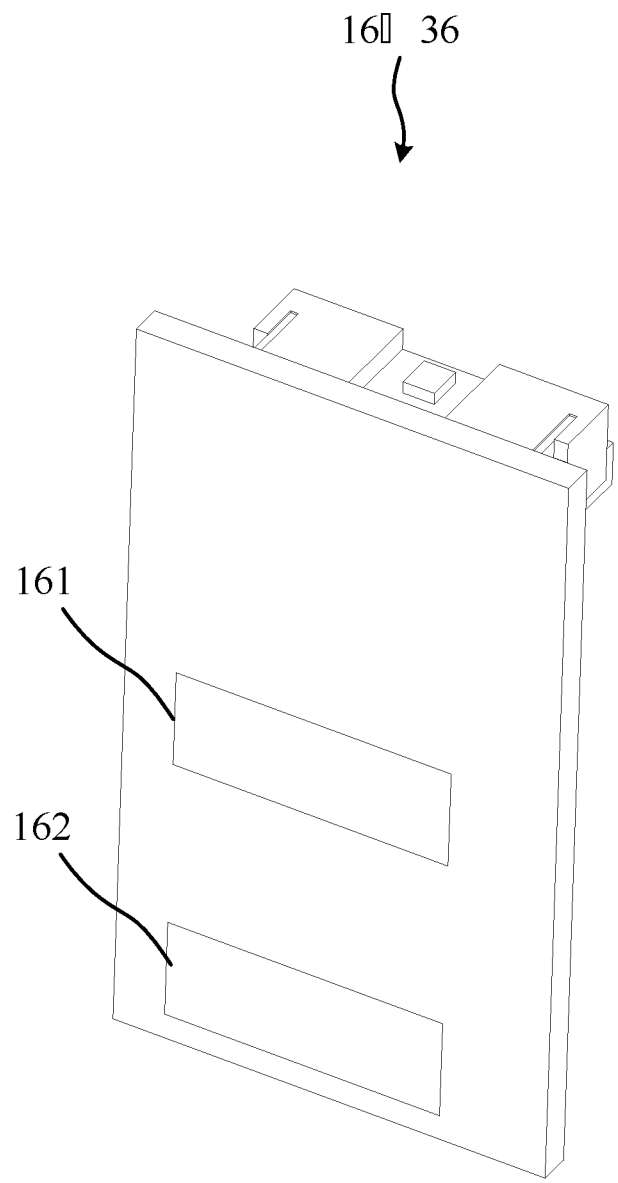
FIG. 2 shows a schematic diagram of the liquid level detector in one embodiment of the present invention.

Please refer to FIG. 2. FIG. 2 shows a schematic diagram of the liquid level detector 16 in one embodiment of the present invention. In one embodiment, the liquid level detector 16 is configured by measuring the level height that can be observed clearly, such as a laser ranging method. As a result, the gas generator 1 may determine the amount of the supplementary water 141 for supplying into the electrolysis device 12. In another embodiment, the liquid level detector 16 is configured for monitoring whether the liquid level exceeds a monitoring height, and the gas generator 1 may determine whether the supplementary water 141 is to be driven and the amount thereof for supplying into the electrolysis device 12. In another embodiment, the liquid level detector 16 is configured for monitoring whether the liquid level is located within a monitoring zone so that the amount of the supplementary water 141 can be ensured for sufficient normal electrolysis to produce hydrogen. In another embodiment, the liquid level detector 16 is a capacitive water level gauge comprising parasitic capacitance for sensing the change of liquid amount. The capacitive water level gauge is affixed to the high water level electrode 161 and the low water level electrode 162 on the outer surface of the electrolysis device 12 in order to measure the amount of the electrolyzed water 121. In practice, the liquid level detector 16 may either preset an electrolysis low limit as the minimum water level required for electrolysis or add an additional safe water level. The liquid level detector 16 may further preset an electrolysis high limit as the safe stock level required for electrolysis. The electrolyzed water 121 may be at the electrolysis high limit level or any height between the electrolysis low limit level and the electrolysis high limit level in the electrolysis device 12. If the liquid level measured by the liquid level detector 16 is lower than the preset electrolysis low limit, the gas generator 1 is informed to drive the supplementary water 141 of the water supplying device 14 to flow into the electrolysis device 12. If the liquid level measured by the liquid level detector 16 is higher than the preset electrolysis high limit, the gas generator 1 is informed to stop supplying the supplementary water 141.

In practice, the hydrogen produced by the gas generator 1 is for human inhalation. In other practice, the hydrogen produced by the gas generator 1 can further be mixed with other gases to produce a healthy gas that is absorbable for human; please refer to FIG. 1, in order to mix the hydrogen with other gases, the gas generator 1 further comprises an atomized module including an atomization reaction chamber 18 for producing an atomized gas. The atomization reaction chamber 18 is coupled to the electrolysis device 12 for mixing the generated hydrogen with the atomized gas to produce the healthy gas, wherein the atomized gas comprises at least one of water vapor, atomized syrup, volatile essential oil and combinations thereof.

Figure 3:
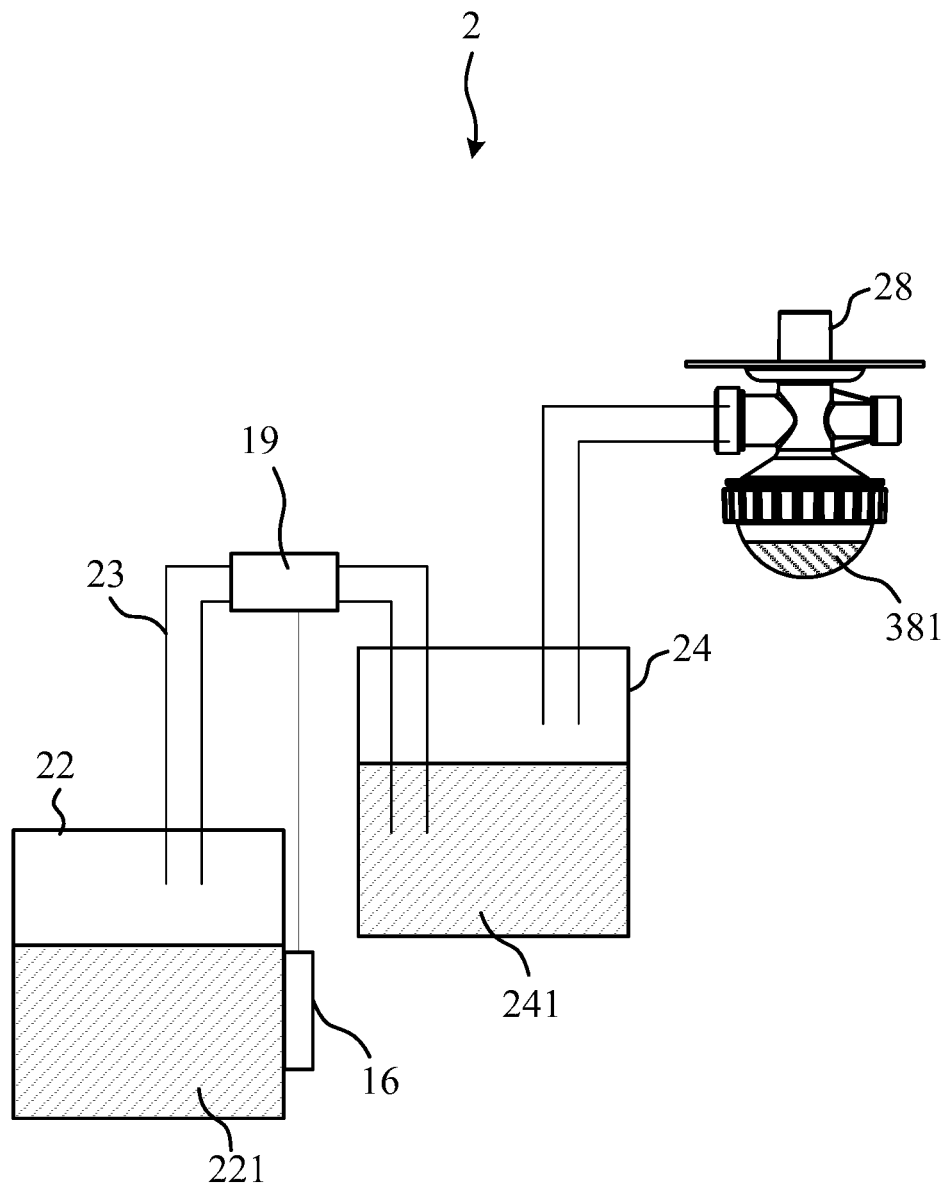
FIG. 3 shows a schematic diagram of the gas generator in another embodiment of the present invention.

Please refer to FIG. 3. FIG. 3 shows a schematic diagram of the gas generator 2 in another embodiment of the present invention. As shown in FIG. 3, this particular embodiment differs from the embodiment shown in FIG. 1 in that the water supplying device 24 has a casing and is configured between the electrolysis device 22 and the atomization reaction chamber 28, wherein the hydrogen produced by the electrolysis device 22 can pass into the supplementary water 241 in the water supplying device 24 through the water supplying channel 23 and finally pass into the atomization reaction chamber 28. In practice, the gas produced by the electrolysis device 22 may be subject to high temperatures due to the operating environment and the production mode. Simultaneously, the volatile water vapor is generated due to the high temperature, so that the generated gas will be hot and humid. Moreover, the volatile water vapor is not only composed of electrolyzed water but also mixed with the electrolyte or impurities in the electrolysis liquid. Therefore, the generated gas not only contains the required pure hydrogen, pure oxygen or hydrogen-oxygen mixed gas but also contains unnecessary moisture, electrolytes, and impurities that are not suitable for human inhalation. These high temperature and humid impurities contained in the gas are not only harmful for human, but may also corrode the pipelines and the components as the gases flow through, thereby causing failure of the gas generator. Thus, it is necessary to condense and filter the produced hydrogen. Under this condition, the supplementary water 241 in the water supplying device 24 can not only be used in the electrolysis device 22 as the electrolyzed water 221 but that the hydrogen produced by the electrolysis device 22 can be cooled down and filtered through the supplementary water 241. Consequently, the life and safety of the gas generator 2 can be enhanced. At the same time, the electrolyte dissolved in the supplementary water 241 through filtration can be filled back into the electrolysis device 22. It is noted that the functions and configurations of the gas generator 2 are substantially the same as those corresponding to the above-mentioned embodiments, and therefore they will not be described in detail.

Figure 4:
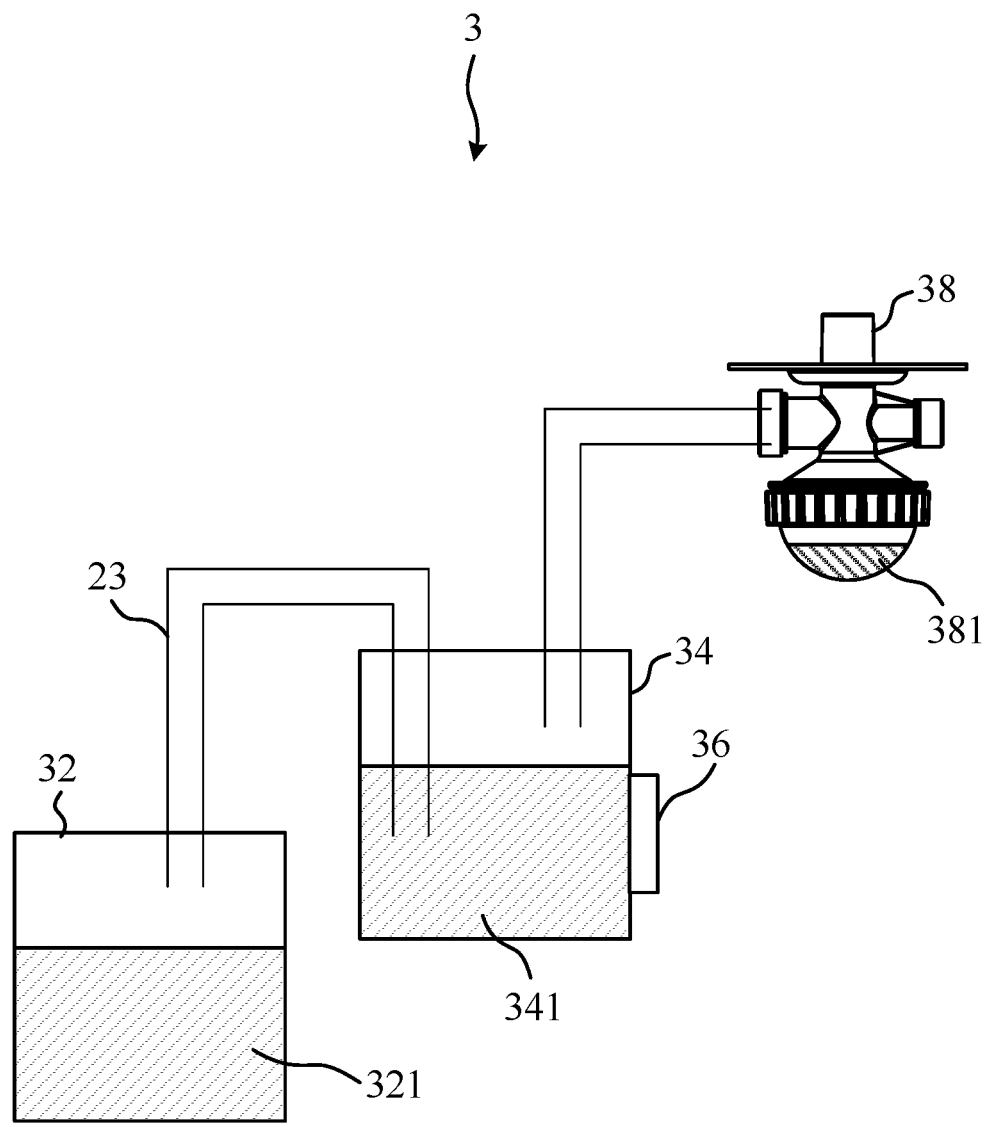
FIG. 4 shows a schematic diagram of the gas generator in another embodiment of the present invention.

Please refer to FIG. 2 and FIG. 4. FIG. 4 shows a schematic diagram of the gas generator 3 in another embodiment of the present invention. Another embodiment of the present invention is to provide a gas generator 3. According to one of the embodiment, the present invention gas generator 3 comprises an electrolysis device 32, a water supplying device 34, and a liquid level detector 36. The electrolysis device 32 contains electrolyzed water 321 and electrolyzes the electrolyzed water 321 to generate hydrogen. The water supplying device 34 contains supplementary water 341 and supplies the supplementary water 341 into the electrolysis device 32. The liquid level detector 36 is coupled to an outer surface of the water supplying device 34 and is not in contact with the supplementary water 341, wherein the liquid level detector 36 generates a detecting signal by detecting a liquid level of the supplementary water 341. As shown in FIG. 4, this particular embodiment differs from the embodiment shown in FIG. 3 in that the liquid level detector 36 is configured on an outer surface of the water supplying device 34.

In one embodiment, the gas generator 3 may determine whether the supplementary water 341 in the water supplying device 34 is to be supplied into the electrolysis device 32 according to the liquid level measured by the liquid level detector 36. Wherein the liquid level detector 36 comprises an electrode plate and the liquid level detector generates the detecting signal to determine whether the liquid level exceeds a monitoring height. The gas generator 3 may determine the amount of the supplementary water 341 for supplying into the electrolysis device 32 according to the detecting signal generated by the liquid level detector 36. In one embodiment, when the liquid level exceeds a monitoring height, the liquid level detector 36 will generate a detecting signal, and the gas generator 3 will supply the supplementary water 341 into the electrolysis device 32 according to the detecting signal and keep supplying until the liquid level of the supplementary water 341 in the water supplying device 34 is lower than a monitoring height. In another embodiment, when the liquid level is lower than a monitoring height, the liquid level detector 36 will generate a detecting signal, and the gas generator 3 will generate an alarm or stop supplying the supplementary water 341 into the electrolysis device 32.

In another embodiment, the liquid level detector 36 is configured for monitoring whether the liquid level is located within a monitoring zone so that the amount of the supplementary water 341 can be ensured for sufficient normal electrolysis to produce hydrogen. In another embodiment, the liquid level detector 36 is a capacitive water level gauge that senses the amount of change in its parasitic capacitance by being affixed to the high water level electrode 161 and the low water level electrode 162 on the outer surface of the water supplying device 34 in order to measure the amount of the supplementary water 341. In practice, the liquid level detector 16 may either preset a supplementary low limit as the minimum water level required for outputting the supplementary water 341 or an additional safe water level. The liquid level detector 36 may further preset a supplementary high limit as the safe stock level required for accommodating the supplementary water 341 in the water supplying device 34. As the electrolysis device 32 continuously electrolyzes the electrolyzed water 321 to generate hydrogen gas, and the liquid level detected by the liquid level detector 36 is higher than the preset supplementary low limit or higher than the preset supplementary high limit, the gas generator 3 is informed to drive the supplementary water 341 in the water supplying device 34 to flow into the electrolysis device 32. If the liquid level measured by the liquid level detector 36 is lower than the preset supplementary low limit, the gas generator 3 is informed to stop supplying the supplementary water 341. In another embodiment, the gas generator 3 can estimate the consumption of the electrolyzed water 321 according to the time of electrolysis of the electrolysis device 32, the amount of gas produced, and the power consumed by the gas generator 3. Then, an estimated amount of supplementary water 341 is supplied into the electrolysis device 32 through the monitor of the liquid level detector 36.

Figure 5:
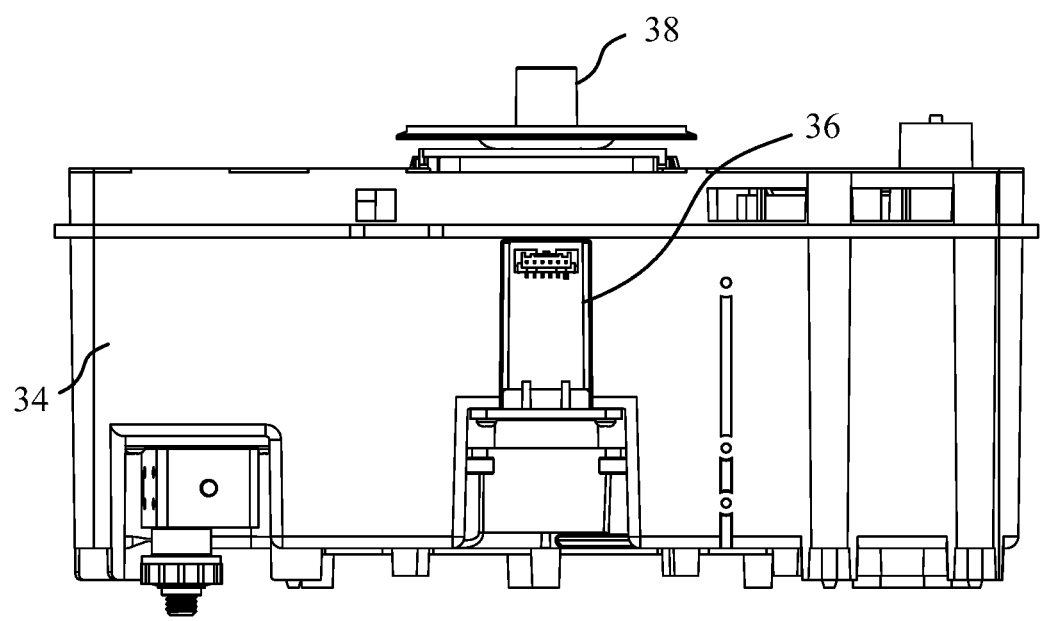
FIG. 5 shows a schematic diagram of the water supplying device in one embodiment of the present invention.
Figure 6:
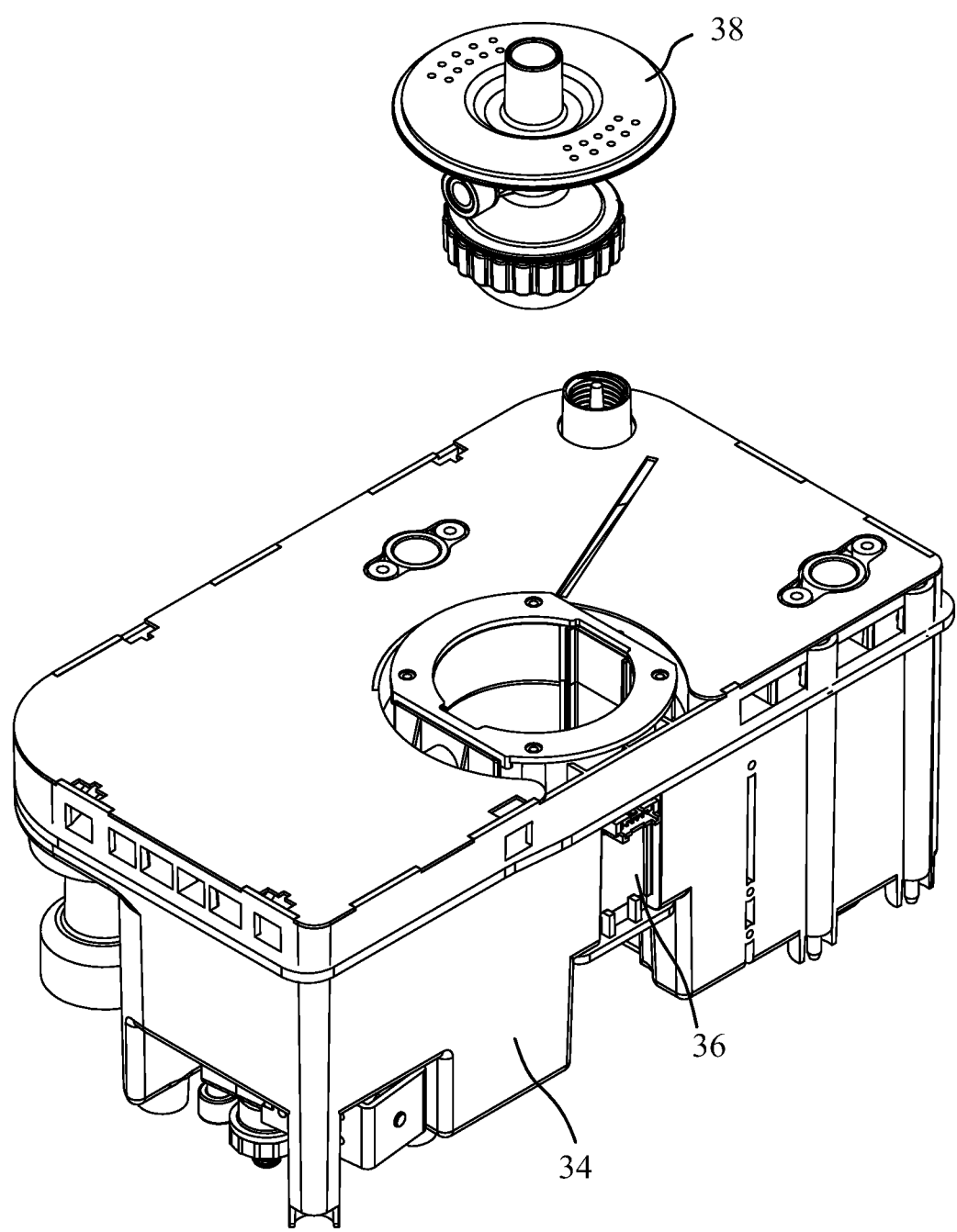
FIG. 6 shows a different view of exploded drawing according to FIG. 5.

Please refer to FIG. 4, FIG. 5, and FIG. 6. FIG. 5 shows a schematic diagram of the water supplying device 34 in one embodiment of the present invention. FIG. 6 shows a different view of exploded drawing according to FIG. 5. In practice, the above-mentioned atomization reaction chamber 38 may be partially accommodated in the water supplying device 34 in order to reduce both the volume requirement of the gas generator 3 and the gas movement path. The liquid level detector 36 is affixed to the outer surface of the water supplying device 34 for monitoring the liquid level of the supplementary water 341. In addition, the liquid level detector 36 may comprise a circuit slot electrically connected to the switch control system of the gas generator 3, so the liquid level detector 36 may inform the above-mentioned switch control system with the detecting signal generated by the circuit slot. Thus the switch control system can drive the supplementary water 341 to flow into the electrolysis device 32 according to the detecting signal, wherein the switch control system is configured to control the above-mentioned water valve or the water pump for supplying the supplementary water 341 into the electrolysis device 32. In practice, the atomized gas produced by the atomization reaction chamber 38 may be converted from a precursor liquid 381, and the gas generator 3 may further comprise an atomization generating element for converting the precursor liquid 381 into an atomized gas. In one embodiment, the atomization generating element is an oscillator for oscillating the precursor liquid and converting the precursor fluid into an atomized gas. In another embodiment, the oscillator is configured on the outer surface of the water supplying device 34, and the atomization reaction chamber 38 carrying the precursor liquid 381 is covered by the supplementary water 341. At this point, the oscillator converts the precursor liquid 381 into the atomized gas by oscillating the supplementary water 341. In another embodiment, the water supplying device 34 further comprises an accommodating space for receiving the oscillating water used by the atomization reaction chamber 38. The oscillator is coupled to the accommodating space and oscillates the oscillating water in a direct or indirect manner for converting the precursor liquid 381 into an atomized gas. In another embodiment, the atomization generating element is a heater for directly heating the precursor liquid 381 or through heating the atomization reaction chamber 38 to convert the precursor liquid 381 to an atomized gas. In another embodiment, the heater may indirectly heat the precursor liquid 381 through heating the liquid coated outside the atomization reaction chamber 38 to produce an atomized gas, wherein the coating liquid is the above-mentioned supplementary water 341. Furthermore, through measuring the liquid level of the supplementary water 341 by the liquid level detector 36, the gas generator 3 will prevent the damage of the atomization generating element from dry-boiling. In addition, the atomized module comprises the atomization reaction chamber 38, an upward extending tube above the atomization reaction chamber 38, two laterally extending structures extending from opposite sides of the upward extending tube, and a disk structure surrounding the upward extending tube, wherein one of the two laterally extending structures is fluidly coupled to the water supplying device to receive the hydrogen gas.

Figure 7:
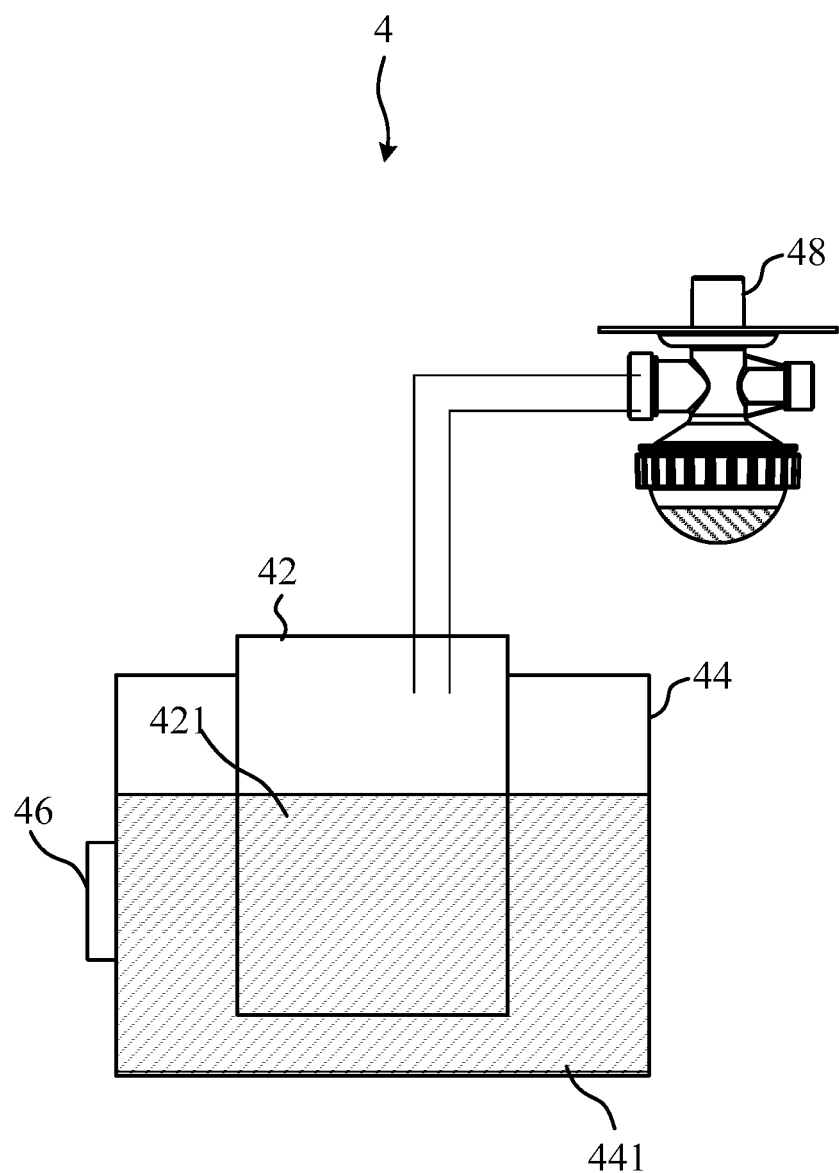
FIG. 7 shows a schematic diagram of the gas generator in another embodiment of the present invention.

Please refer to FIG. 7. FIG. 7 shows a schematic diagram of the gas generator 4 in another embodiment of the present invention. As shown in FIG. 7, this particular embodiment differs from the embodiment shown in FIG. 1 in that the electrolysis device 42 is configured in the water supplying device 34 while the liquid level detector 46 is configured for measuring the supplementary water 441 of the water supplying device 44. The supplementary water 441 is supplied into the electrolysis device 42 through gravity or applying external force for producing hydrogen, and then the generated hydrogen is directly passed to the atomization reaction chamber 48. Alternatively, the generated hydrogen may be passed through the supplementary water 441 for being cooled down and filtered first, and then be passed to the atomization reaction chamber 48. In practice, the process that filtering and cooling down the high-temperature hydrogen can also filter some impurities and electrolyte contained in the hydrogen. In another embodiment, the gas generator 4 may adjust the relative height of the electrolysis device 42 and the water supplying device 44 according to the detecting signal of the liquid level detector 46 so that the supplementary water 441 can spontaneously flow into the electrolysis device 42. In addition, the liquid level detector 46 is coupled to the outer surface of the electrolysis device 42 for detecting the liquid level of the electrolyzed water 421.

In conclusion, the present invention is to provide a gas generator for health application using an electrolyzing method to generate hydrogen. The gas generator comprises an electrolysis device, a water supplying device, and a liquid level detector. The electrolysis device generates hydrogen, and the hydrogen is filtered by the water supplying device for inhalation by a user. The gas generator measures the liquid level by using the non-contact liquid level detector, and the supplementary water is supplied into the electrolysis device according to the liquid level to ensure that the electrolysis device contains sufficient water for electrolyzing. Therefore, the life and operating safety of the gas generator can be enhanced.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A gas generator, comprising:
   an electrolysis device configured to contain an electrolyzed water and to electrolyze the electrolyzed water to generate a hydrogen gas;
   a water supplying device separated from the electrolysis device and configured to contain a supplementary water, the water supplying device being configured to receive the hydrogen gas and to supply the supplementary water into the electrolysis device, wherein the water supplying device has a casing;
   an atomized module configured to receive the hydrogen gas via the water supplying device and to mix an atomized gas with the hydrogen gas, wherein the casing of the water supplying device forms a space configured to accommodate a part of the atomized module, the atomized module comprising an atomization reaction chamber, an upward extending tube above the atomization reaction chamber, two laterally extending structures extending from opposite sides of the upward extending tube, and a disk structure surrounding the upward extending tube, wherein one of the two laterally extending structures fluidly coupled to the water supplying device to receive the hydrogen gas; and
   a liquid level detector either coupled to an outer surface of the electrolysis device and not in contact with the electrolyzed water or coupled to the casing and not in contact with the supplementary water, the liquid level detector being configured to detect a liquid level of the electrolyzed water or a liquid level of the supplementary water and then to selectively generate a detecting signal.

2. The gas generator of claim 1, wherein the atomized module further comprises an atomization generating element coupled to the atomization reaction chamber and configured to convert a precursor liquid contained in the atomization reaction chamber into the atomized gas.

3. The gas generator of claim 1, wherein the water supplying device is coupled to the electrolysis device and the atomization reaction chamber, and the atomization reaction chamber receives the hydrogen gas generated by the electrolysis device through the water supplying device.

4. The gas generator of claim 1, wherein the water supplying device is coupled to the electrolysis device for receiving the hydrogen gas generated by the electrolysis device.

5. The gas generator of claim 4, wherein the hydrogen gas is passed into the supplementary water of the water supplying device.

6. The gas generator of claim 1, wherein the gas generator is configured to supply the supplementary water into the electrolysis device according to the detecting signal.

7. The gas generator of claim 6, wherein the supplementary water is supplied into the electrolysis device when the liquid level detected by the liquid level detector is lower than a preset electrolysis low limit, and the supplying of the supplementary water is stopped when the liquid level is higher than a preset electrolysis high limit, and the electrolysis low limit is lower than the electrolysis high limit.

8. The gas generator of claim 6, further comprising a water supplying pump coupled to the electrolysis device, the water supplying device being configured to drive the supplementary water to flow into the electrolysis device.

9. The gas generator of claim 1, wherein the liquid level detector is a capacitive water level gauge.

10. A gas generator, comprising:
an electrolysis device configured to contain an electrolyzed water and to electrolyze water to generate a hydrogen gas;
a water supplying device separated from the electrolysis device and configured to contain a supplementary water, the water supplying device being configured to receive the hydrogen gas and to supply the supplementary water into the electrolysis device, wherein the water supplying device has a casing;
an atomized module configured to receive the hydrogen gas via the water supplying device and further generate an atomized gas to mix the atomized gas with the hydrogen gas, and the casing of the water supplying device forms a space configured to accommodate a part of the atomized module, the atomized module comprising an atomization reaction chamber, an upward extending tube above the atomization reaction chamber, two laterally extending structures extending from opposite sides of the upward extending tube, and a disk structure surrounding the upward extending tube, wherein one of the two laterally extending structures fluidly coupled to the water supplying device to receive the hydrogen gas; and
a liquid level detector coupled to the casing of the water supplying device and not in contact with the supplementary water, the liquid level detector being configured to detect a liquid level of the supplementary water and then to selectively generate a detecting signal.

11. The gas generator of claim 10, wherein the supplementary water in the water supplying device is supplied into the electrolysis device via a water supplying channel, and the water supplying device receives the hydrogen gas via the water supplying channel.

12. The gas generator of claim 10, wherein the atomized module further comprises an atomization generating element coupled to the atomization reaction chamber, the atomization generating element being configured to convert a precursor liquid contained in the atomization reaction chamber into the atomized gas.

13. The gas generator of claim 12, wherein the atomization generating element oscillates an oscillating water for converting the precursor liquid into the atomized gas.

14. The gas generator of claim 10, wherein the gas generator supplies the supplementary water into the electrolysis device according to the detecting signal.

15. The gas generator of claim 10, wherein the liquid level detector is a capacitive water level gauge.

16. The gas generator of claim 10, wherein the water supplying device is coupled to the electrolysis device, and the hydrogen gas generated by the electrolysis device is passed into the supplementary water.

17. The gas generator of claim 10, wherein the liquid level detector comprises an electrode plate, and the liquid level detector generates the detecting signal when the liquid level is lower than the height of the electrode plate.

18. The gas generator of claim 10, wherein the liquid level detector comprises two electrode plates, configured to generate different detecting signals according to whether the liquid level is lower than the height of the two electrode plates, between the height of the two electrode plates, or higher than the height of the two electrode plates.

19. The gas generator of claim 10, wherein the electrolysis device is configured in the water supplying device.

* * * * *